Patented Dec. 8, 1942

2,304,431

UNITED STATES PATENT OFFICE 2,304,431

METHOD OF EFFECTING CHEMICAL REACTIONS INVOLVING FORMALDEHYDE

Joseph Frederic Walker, Lewiston, N. Y., assignor to E. I. du Pont de Nemours & Company, Wilmington, Del., a corporation of Delaware No Drawing. Application January 26, 1940, Serial No. 315,859

7 Claims. (Cl. 260—57)

This invention relates to a method of effecting chemical reactions such as those previously carried out using formaldehyde, paraformaldehyde, or the like as one of the reactants. More particularly the invention relates to a method of carrying out such reactions wherein trioxane is employed as the source of formaldehyde.

It has heretofore been the practice to carry out chemical reactions involving formaldehyde by using ordinary aqueous formaldehyde solution or the commercially available polymer of formaldehyde, paraformaldehyde, as a starting material. Formaldehyde is a very reactive compound and it is frequently difficult to control the rate and course of such reactions since the formaldehyde, when added as an aqueous solution or as paraformaldehyde, is present in the reaction mixture substantially in the form of monomeric formaldehyde so that, the conditions of the reaction being suitable, the reaction proceeds readily and sometimes at rates which are difficult to control. Furthermore, aqueous formaldehyde and paraformaldehyde, as well as other of the more well known formaldehyde polymers, are not soluble in and not compatible with many organic materials, which fact limits considerably their value in organic synthesis reactions.

It is an object of this invention to provide an improved method of carrying out reactions involving formaldehyde as one of the reactants. A further object is the provision of a method for carrying out chemical reactions using trioxane as the source of formaldehyde in such reactions and to prepare and provide mixtures, solutions, and the like which contain trioxane and a formaldehyde acceptor and which are useful in carrying out such reactions. A particular object of the invention is to provide a new and improved method for preparing reaction products of phenols with formaldehyde and to provide new compositions of matter from which such reaction products may be readily obtained. These and still further objects will be apparent from the ensuing description of the invention.

Trioxane, a cyclic trimer of formaldehyde known also as alpha-trioxymethylene, was first prepared by Pratesi in 1885 (Gazz. Chim. Ital, 14, 139). It is obtained as colorless plastic crystals melting at 63°–64° C. and boiling at 114° C. The compound is stable at normal temperatures and can be distilled without decomposition. It has a pleasant odor resembling chloroform and, when pure, has no formaldehyde odor. Trioxane is readily soluble in alcohols, ketones, ethers, chlorinated solvents and aromatic and various other organic compounds, but is difficultly soluble in pentane and petroleum ether. It is soluble in water to the extent of 20% at 20° C. and is not decomposed by hot water.

The above objects may be accomplished in accordance with the present invention by treating trioxane in the presence of a formaldehyde acceptor and in an anhydrous or a substantially anhydrous reaction medium with a substance capable of depolymerizing trioxane to yield formaldehyde. I have discovered that trioxane constitutes an excellent source of formaldehyde in such reactions since it remains substantially inert towards the formaldehyde acceptor material except under certain conditions which are easily controllable so as to permit control of the reaction in a practical manner. Formaldehyde as present in aqueous formaldehyde solutions or in paraformaldehyde is very active towards, for example, phenol, which fact makes control of reactions involving ordinary forms of formaldehyde relatively difficult. In contrast, trioxane may be mixed with phenol or other formaldehyde acceptor materials in accordance with my invention without any reaction occurring. Reaction may be initiated by the addition of a depolymerization catalyst to the mixture, followed by heating. If a sufficient amount of the catalyst is used, reaction may frequently be initiated even at ordinary temperatures. The depolymerization catalyst appears to effect liberation of formaldehyde in a particularly active form and the rate at which such liberation occurs is largely dependent upon the temperature and the amount of catalyst used.

In addition to reactions involving phenols, the present method may be applied with good results in effecting various chemical reactions involving, for example, proteins, aromatic hydrocarbon compounds, textiles, paper, alcohols, and many other substances which are known to react with formaldehyde. A particularly important application of the method, however, is its use in preparing phenol-formaldehyde reaction products, e. g. phenol-formaldehyde resins.

The present method should be carried out under anhydrous or substantially anhydrous conditions. The presence of relatively small amounts of water is not epecially harmful; however, when a large amount of water is present, the reaction proceeds slowly. As a general matter, it might be stated that any amount of water present, aside from water that may be formed in the reaction, should not exceed about 10% of the weight of the reaction mixture. In the preferred embodiment of the invention, the water present should not exceed about 5% of the weight of the reaction mixture.

There should be present in the reaction mixture a substance which will catalyze the depolymerization of trioxane. There are many substances which may be used as depolymerization catalysts in practicing the present method. The choice of catalyst should be made in accordance with the particular type of reaction involved and, while one catalyst may be superior for a given reaction, it may not be as effective as another catalyst in a second reaction. Thus, for preparing phenol-formaldehyde reaction products strong acids such as sulfuric acid, hydrochloric acid, chlorosulfonic acid and phosphoric acid are very effective while acids such as chloroacetic acid, acetic acid, oxalic acid and boric acid are comparatively ineffective. However, in the case of other reactions, certain acids or other catalysts which are not particularly effective in the production of phenol-formaldehyde reaction products may be suitable and may even be superior to, for example, sulfuric or hydrochloric acid as the catalyst. Also in the case of some reactions, such as those involved in the creaseproofing of textile materials by means of trioxane, substances such as inorganic compounds which hydrolyze in water to give an acid reaction, are effective and are preferred over strong acids. Illustrative of these compounds are: aluminum chloride, zinc chloride, ferric chloride, antimony chloride, tin tetrachloride, sulfuryl chloride, ammonium chloride, and the like, which compounds are also effective in reactions involving phenol. The metal halides, particularly the chlorides, of this group are especially effective. It is frequently advantageous to use a mixture of substances, e. g. a mixture of zinc chloride and acetic acid, as catalyst.

The action of trioxane in reactions such as those mentioned above is believed to be unique in that trioxane, except in the presence of depolymerization catalysts, is completely unreactive or substantially so and does not act as a source of formaldehyde. This is explainable on the basis of the accepted structure for trioxane as indicated by the following formula which includes three ether linkages and is devoid of any aldehyde or methylol group.

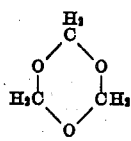

Under normal conditions and even at temperatures exceeding its atmospheric boiling point (114° C.), trioxane gives no test for formaldehyde by any of the usual methods of analysis, being outstandingly different from other formaldehyde polymers in this respect. However, under proper conditions, i. e. in the presence of a depolymerization catalyst and particularly when a formaldehyde acceptor is also present in an anhydrous medium, trioxane undergoes depolymerization very readily to produce formaldehyde, believed to be in monomeric form, which formaldehyde is very reactive. This, together with the fact that trioxane is a solvent for or is soluble in many organic substances renders the compound especially suitable for use as a source of formaldehyde in effecting chemical reactions involving organic compounds.

Throughout this specification and in the appended claims, the term "formaldehyde acceptor" is used to mean any compound or substance which, under the conditions of the reaction or treatment involved will combine with formaldehyde.

The present invention is further illustrated by the following examples relating particularly to the preparation of reaction products of formaldehyde with phenolic compounds.

*Example I*

One gram mol of crystalline phenol was mixed with one formaldehyde equivalent (30 grams) of trioxane crystals at room temperature. Solution took place with considerable heat absorption and a clear liquid was obtained having a density of roughly 1.1 at room temperature. The clear liquid or solution began to crystallize at about 17° C. when chilled and boiled in the range of 143 to 145° C. Apparently phenol and trioxane forms a constant boiling mixture, since it is not possible to effect a clean separation of phenol and trioxane from such mixtures by distillation methods. Chemical analyses of such solutions indicate that the phenol is substantially unchanged since approximately 98% of the phenol in a solution made up of equal parts of phenol and trioxane is determinable by the iodimetric procedure of Redman, Weith and Brock (Allen's Commercial Organic Analyses, Fifth Edition, vol. III, page 282).

Phenol-trioxane solutions prepared as above remain stable over an indefinite period of time so long as no depolymerization catalyst is present in the mixture. On the other hand, a solution prepared from one equivalent of formaldehyde, as paraformaldehyde, and one gram mol of phenol is a pasty solid at room temperature, which solid becomes a clear liquid only at temperatures above 80° C. Such a mixture reacts with violence to give a resin when heated with a trace of acid. In contrast, 10 grams of a solution of one formaldehyde equivalent of trioxane in one gram mol of phenol may be caused to react by the addition of 0.01% of sulfuric acid (added as a 2% aqueous solution) as depolymerization catalyst by initiating the reaction with heat, e. g. at 70° C. Instead of a violent reaction occurring, the temperature gradually rises to a maximum of about 130° C. and then drops off. The liquid thus obtained is soluble in methanol, but insoluble in 1 to 2 times its volume of hot water whereas the unreacted phenol-trioxane mixture dissolves readily in water under these conditions. The reaction may be furthered, either with or without addition of more trioxane, by the application of heat for a time consistent with the desired results. By the addition of larger quantities of acid to the phenol-trioxane solution, more energetic reactions may be caused with the production of solid resins. If sufficient acid is added, the reaction may be caused to start even at room temperature.

*Example II*

Phenol was treated with a quantity of trioxane equal to 0.9 mol of formaldehyde per mol of phenol. The reaction between the phenol and trioxane was effected by the addition of hydrogen chloride equivalent to 0.04% by weight of the reaction mixture and heating the mixture. A clear, tacky, permanently fusible resin having a light amber color was obtained.

Example III

A solution of two formaldehyde equivalents of trioxane in one molecular proportion of phenol produced a clear liquid at temperatures above −3° C., which liquid boiled at 141–143° C. Upon heating the mixture with a trace of a depolymerization catalyst, such as sulfuric acid or hydrochloric acid, products ranging from clear liquids to solid resins were obtained.

Example IV

Trioxane equivalent to 1½ mols of formaldehyde was dissolved in one mol of cresol to give a clear liquid having a density of about 1.08 at 25° C. Upon addition of 1 cc. of concentrated hydrochloric acid solution to 20 cc. of the trioxane-cresol solution, a reaction took place which resulted in the formation of a solid resin. When using 0.1 cc. of 10% sulfuric acid as catalyst, a gentle reaction took place on heating to 115 to 120° C. and a liquid reaction product resulted on refluxing for a short time.

Example V

Trioxane equivalent to 1 mol of formaldehyde was dissolved by heating in 2 mols of beta-naphthol. The addition of a small amount of hydrochloric acid as a depolymerization catalyst at 100° C. caused an exothermic reaction to take place. A crystalline product melting at 202° C. after recrystallization from alcohol was produced in practically quantitative yield. The material was probably methylene di-beta-naphthol.

Phenolic compounds are generally compatible with trioxane in all proportions giving stable solutions which do not change on heating or long storage. Phenol-formaldehyde reaction products are produced when such solutions are treated with small amounts of depolymerization catalysts such as sulfuric acid, hydrochloric acid, zinc chloride, ferric chloride, or the like. The type of reaction product may vary considerably depending upon the proportions of the reactants used, the temperature treatment given and whether or not other substances are present during the reaction which acts to modify the final product. As will be evident to those skilled in the art, the trioxane-phenol reactions may be stopped at any desired stage, e. g. by reducing the temperature of the reaction mixture, by destroying the catalyst, or by both methods.

In general, there is nothing critical about the proportions of reactants used, the proportions being chosen in accordance with the reaction involved and the type of product desired. The amount of catalyst may be varied over a wide range, but amounts within the range of 0.001 to 10% and preferably 0.01 and 1% of the weight of the reaction mixture will generally suffice. In certain reactions, e. g. halomethylation reactions, it may be desirable to use the catalyst in much higher concentrations, but for most reactions, relatively low catalyst concentrations give good results. The amount of catalyst and the temperature of operation should be so chosen as to permit suitable control of the rate of reaction.

The invention may be practiced employing, for example, urea or a urea-like substance, in place of phenol as the formaldehyde acceptor. Thus, urea-formaldehyde resins may be prepared employing the same types of catalysts which are effective in reactions involving phenol. Also, proteins may be used as the acceptor material, in which case, the protein which it is desired to be reacted with formaldehyde is brought into contact with trioxane under substantially anhydrous conditions in the presence of a suitable depolymerization catalyst. I have found that compressed castings of moist casein may be hardened in a comparatively short time, e. g. one hour, by immersion in a hot solution of trioxane in trichlorethylene, to which solution has been added a small amount of a saturated solution of zinc chloride in glacial acetic acid.

Other modifications of the present improved method for effecting reactions involving formaldehyde include the treatment of textile materials, such as cotton or rayon fabric, paper or wood. Thus textile materials may be treated with trioxane so as to increase the crease-resistance of the material. A convenient way for accomplishing this is illustrated in the following example:

Example VI

Cotton cloth, previously washed in soap and water, was subjected to the action of a boiling solution consisting of 11% by weight of trioxane dissolved in trichlorethylene, which solution also contained 6% by weight of a 10% solution of zinc chloride in acetic acid. After continuing the boiling treatment for one hour, the textile material was practically crease-proof. No final baking treatment was required as is usually the case when textile materials are treated with ordinary sources of formaldehyde. The same treatment is also applicable to paper whereby the wet-strength of the paper is materially increased. Furthermore, my method may be used for setting creases, such as pleats and the like, in textile materials.

The present method may also be practiced in carrying out halomethylation reactions in which case the yields of the product are generally superior to those obtainable when, for example, paraformaldehyde is used as the source of formaldehyde. The following examples illustrate this adaptation of the invention:

Example VII

Sixty grams of trioxane, equivalent to 2 mols of formaldehyde, were dissolved in 260 grams (2 mols) of octanol. Hydrogen chloride gas was passed into the solution at atmospheric pressure. During the absorption period of about 1½ hours, the solution was stirred and maintained at about 20 to 25° C. The mixture separated into aqueous and product layers. The product layer, after being dried over sodium sulfate, was distilled to isolate octyl chloromethyl ether in an amount corresponding to a yield of 92.5%.

In the above example, hydrogen chloride served both as catalyst and as a reactant.

Example VIII

A 12-liter, 3-nicked flask was set up in a water bath and equipped with an inlet for hydrogen chloride gas, a mercury-seal stirrer, a thermometer and a reflux condenser. The flask was charged with 6340 grams of benzyl chloride, 750 grams of trioxane and 750 grams of anhydrous zinc chloride. Hydrogen chloride gas was passed into the charge, with good stirring, at a rate of 8 grams/min. The charge was maintained at a temperature below 40° C. for the first hour, after which it was gradually warmed until no more hydrogen chloride was absorbed and a maximum temperature of 80° was reached. The reaction mixture formed two layers. The aqueous layer was extracted with methylene chloride and from the extract obtained and from the non-aqueous layer of the reaction mixture, there was isolated ortho and para xylylene dichloride in amounts corresponding to a 59% yield based upon unrecovered benzyl chloride, a 64% yield based upon the trioxane used and a 70% yield based upon the hydrogen chloride used. Pure para xylylene dichloride was isolated in an amount corresponding to 54% of the mixture of ortho and para compounds.

The method here disclosed may also be used to prepare hydrocarbon resins such as are obtainable when formaldehyde is reacted with an aromatic hydrocarbon. Naphthalene is substantially quantitatively converted to a light-colored, tacky resin on reaction with one formaldehyde equivalent of trioxane in the presence of zinc chloride and hydrochloric acid as catalyst. The incompatibility of para-formaldehyde with aromatic hydrocarbons makes it difficult to obtain satisfactory results in reactions of this sort when using paraformaldehyde as the source of formaldehyde. According to reports in chemical literature, the use of paraformaldehyde in such reactions results in low yields of dark-colored resins.

As many widely different modifications and applications of the invention may be made without departing from the scope and spirit thereof, it is to be understood that the invention is not limited to the specific embodiments and descriptions thereof herein set forth, except as indicated in the appended claims.

I claim:

1. A method of obtaining reaction products of formaldehyde with a phenol which comprises subjecting trioxane to the action of a depolymerization catalyst therefor in the presence of a phenol and in a substantially anhydrous medium.

2. The method of claim 1 using as the depolymerization catalyst a strong acid.

3. The process comprising treating trioxane with a depolymerization catalyst therefor in the presence of a phenol and in a substantially anhydrous medium and heating the resulting mixture to effect a reaction.

4. The process comprising treating trioxane with a depolymerization catalyst therefor in the presence of phenol and in a substantially anhydrous medium and heating the resulting mixture to effect a reaction.

5. The process of claim 4 using as the depolymerization catalyst a strong acid.

6. A method of carrying out chemical reactions which comprises subjecting trioxane to the action of a depolymerization catalyst therefor in the presence of an organic compound reactive with formaldehyde.

7. The method of producing an artificial resin from an organic compound reactive with formaldehyde to form a resinous product which comprises mixing said organic compound with trioxane and adding to the mixture a catalyst to cause depolymerization of the trioxane.

JOSEPH FREDERIC WALKER.